Dec. 12, 1961 T. G. BROWN, JR 3,013,119

DECODER FOR LINE PRINTER

Filed Jan. 27, 1959

Inventor
THOMAS G. BROWN, JR.
By Charles Baraff
Agent 3,013,119
Patented Dec. 12, 1961

3,013,119
DECODER FOR LINE PRINTER

Thomas G. Brown, Jr., Paramus, N.J., assignor to International Telephone and Telegraph Corporation, Nutley, N.J., a corporation of Maryland Filed Jan. 27, 1959, Ser. No. 789,323
4 Claims. (Cl. 178—25)

This invention relates to decoder circuits for line-at-a-time printers, and more particularly for printers used with electronic computers and the printing of data derived from a computer or the like.

An object of the invention is to provide a circuit for translating from a binary code representation of characters to a pulse time sequence of printing impulses, such as are required to control a line-at-a-time printer.

Another object of the invention is to provide a circuit for storing binary information which is to be printed and decoding the information into a pulse time form by means of shifting registers of binary counters.

A feature of the invention is an information storage matrix comprised of groups of binary counters operated as shift registers wherein each counter group counts down to binary zero for the purpose of providing control and synchronization pulses to a line printer having a rotatable drum with printing characters.

Another feature of the invention is an information storage matrix comprising shift registers having binary counters wherein the information is continuously circulated in a closed cycle and one is subtracted from each information character by a subtracter circuit during each cycle.

In accordance with the invention, binary information bits representing the output of a computer are applied to a storage matrix comprising a shift register having groups of magnetic cores. Each group provides in sequence timing pulses for the printer after a character is set on the cores of a group. These timing pulses fire the hammer circuits associated with a rotating printing drum of a line printer in a desired sequence.

The above-mentioned and other features and objects of this invention will become more apparent by reference to the following description taken in conjunction with the accompanying drawings, in which.

Figure 1:
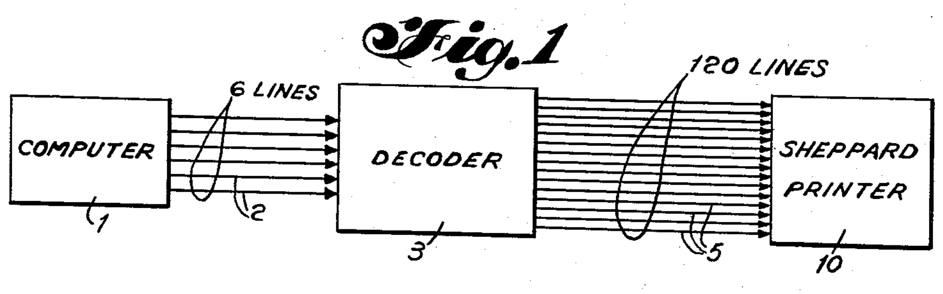
FIG. 1 is a block diagram of a system in accordance with the invention.

Referring to FIG. 1 of the drawing, the electronic computer 1 provides at its output a binary code representation of 64 characters such as alphabetic, numeric and the like on six conductors 2. The computer may be of conventional type or for example, such as are disclosed in U.S. Patent No. 2,708,267, issued May 10, 1955, to J. A. Weidenhammer, or such as disclosed in Proc. I.R.E., August 1947, pages 756–767, "Electronic Computing Circuits" by A. W. Burks.

The coded information which appears at the output of computer 1 and is represented on the six lines 2 in binary code form according to the coding scheme represented below:

| Digits | Code for Characters (Digits, Alphabet, etc.) |
|---|---|
| 0 | 000000 |
| 1 | 000001 |
| 2 | 000010 |
| . | |
| . | |
| . | |
| 9 | 001001 |
| Alphabet | Code for Characters (Digits, Alphabet, etc.) |
| A | 001010 |
| B | |
| C | |
| . | |
| . | |
| Z | |
| etc. | |

These alphabetic, numeric characters and the like are applied in coded form to the printer decoder 3 whence they appear as a sequence of timing pulses on the group of 120 lines 5 leading to printer 10 which may be of the form commonly known as a Sheppard printer, Model 190 manufactured by Sheppard Laboratories, Summit, N.J. The code aforementioned is a convenient one, but other codes for the alpha-numeric characters may be utilized in applying the principles of the invention. It is merely required that the binary order of the particular code utilized be the same as the order in which the characters appear on the printer drum.

Figures 2, 3, 4:
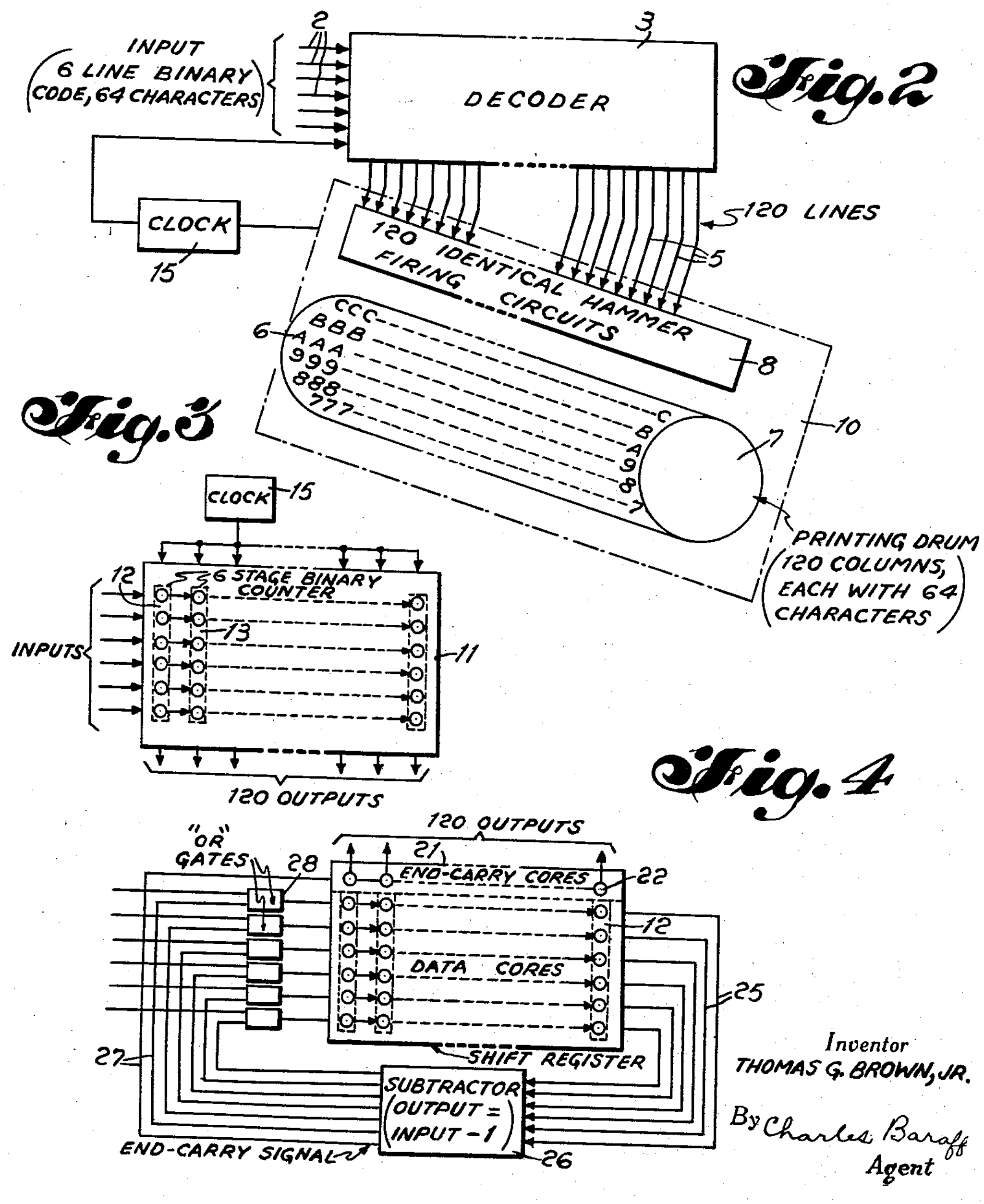
FIG. 2 is a block diagram of the system of FIG. 1 including the decoder and the line printer with the rotating drum of characters associated therewith.
FIG. 3 shows schematically one form of a printer decoder comprising a storage matrix including groups of binary counters forming a shift register.
FIG. 4 shows a block diagram of another form of printer decoder, wherein information bits are circulated in a closed cycle from the output to the input of a shift register.

Referring to FIG. 2, there is shown the association between the printer decoder 3 and the line printer 10 in further detail. As illustrated, the decoder input 2 provides 120 alpha-numeric characters in parallel-serial code form on six conductors 2. The code representation of these characters is stored within a storage matrix of the decoder 3 on binary counters.

The output from the decoder 3 consists of 120 output lines 5 which connect to a line printer 10. Each output line 5 corresponds to a column 6 on the printing drum 7 of the line printer 10.

All of the 120 character columns 6 on the printing drum 7 are identical as shown in FIG. 2, while 64 rows across the drum are such that there is one row for each character.

As the printing drum 7 revolves each of 120 print hammers (not shown) is actuated by a hammer circuit 8 (solenoid actuating a hammer) which fires at a time when the proper character is aligned with the hammer to cause the character to be printed. The firing of each of the 120 hammer circuits is controlled by the timing of the pulse on the corresponding output line 5.

During the course of one drum revolution, the paper remains steady allowing all the characters to be printed; then during the next revolution, the printer decoder 3 is reloaded with new information bits and the paper advances. Printing is again provided during the following revolution of the drum 7 and the cycle is again repeated.

It can be appreciated that the function of the printer decoder 3 is to store binary character information in a storage matrix consisting of groups of binary counters and to produce a sequence of 120 output pulses at the proper time for controlling the printing operation. The information on each of the 120 output lines from the decoder is conveyed by the timing of the sequential pulses appearing on the line 5 to provide synchronization with the rotating printer drum 7.

A pulse on a given line 5 at a particular time will be emitted from the binary counter when it has reached zero and will cause the corresponding hammer of the printer 10 to print that character on the drum which is under the hammer at the time. There will be one and only one pulse per cycle on each decoder output line 5. The particular character printed by each of the 120 hammers will depend on the position in timing of the pulse on the corresponding output line 5 leading to the printer 10.

FIG. 3 illustrates a schematic of the decoder circuit 3. It consists of a storage matrix or array of 720 magnetic cores 11 arranged in groups of six, which form binary counters 12, 13, etc. Although magnetic cores have been shown as the components of the binary counters it should be understood that vacuum tubes, ferrites or other equivalent two-state devices may be employed in lieu of magnetic cores. The binary counters are interconnected as shown in FIG. 3 to provide a matrix shift register 11 so that the information bits may be loaded sequentially by characters, which are shifted along from one binary counter to the next in succession. Six magnetic cores connected together in a column in a manner well-known in the art forms a binary counter.

Thus, each binary character representation is stored on a binary counter 12. During the loading of the decoder, the information bits of each character are successively shifted in groups of six along the matrix 11.

When the rotating drum 7 reaches the first character during its printing cycle, it feeds a timing pulse from the clock 15 to every binary counter 12 causing counting or a stepping down of the counter by 1.

Thus, if the first character happened to be digit 5, represented as binary 000101, the following binary representations would appear on the first counter chain, successively:

000101
000100
000011
000010
000001
000000
111111
111110 etc.

Counting is controlled by the clock signal, derived from and generated by the rotation of the drum, so that stepping of the counters are synchronous with the changing of the characters on the drum. At each succeeeding character during the printing cycle, the counters step by 1. Thus, each counter is stepped 64 times in the drum revolution. At one and only of these times, an output control pulse for the printer is emitted by the counter. This happens when after a count-down, a counter shows binary zero, whereupon a synchronizing pulse to the printer appears on output line 5. The counter continues counting for a total of 64 times and does not stop as soon as it reaches binary zero. Thus, the time at which the printer control pulse occurs, on a given output line 5 depends essentially on the original data stored in the corresponding counter 12 of the register. A characteristic feature of the system described is that, since each character is stepped 64 times per printing cycle, it is restored to its original state at the end of each cycle.

In some applications, it may be desirable to retain the information data for many drum revolutions printing part of it on one printing cycle, another part on a next printing cycle, and so forth without reloading the decoder 3 before each cycle. Thus, a given character may be used many times.

Various ways of clearing a shift register are known which can be utilized in the present decoder translator system, such as setting to zero the counters, or erasing the information previously held therein by the process of loading the register with information bits.

The control pulses are utilized for hammer firing circuits of known construction and by suitable assignment of codes to the characters the pulses will be obtained at the proper time.

The decoder shown in FIG. 3 requires six-bit binary counters connected as a shift register to load them. However, when counting, the binary counter circuits operate at quite a low speed corresponding to the character repetition rate on the printing drum which may be approximately one kilocycle. The circulating decoder shown in FIG. 4 represents a simpler and preferable embodiment. It comprises a magnetic core storage matrix similar to the shift register 11 of FIG. 3 for storing 120 characters. However, in the matrix of FIG. 4, seven bits are utilized, six of them for binary character information while the extra bit serves for end carry i.e. to remember whether an output signal is required during a particular cycle.

Initially, the characters are loaded into the shift register 21 and simultaneously the end-carry cores 22 are all set to zero. The data in the register 21 is shifted to the right in succession and then circulated from output lines 25 of the decoder back to its input via a subtractor circuit 26. The circuit 26 is used to subtract one in binary form from each character and when appropriate an end-carry signal is generated on line 27 and registered in the end-carry cores 22. "Or" gates 28 are provided to control the input of information to the shift register 21.

At the end of the circulation of information data, every character has been stepped down by 1 in the binary code and where required, the end-carry cores 22 have been set. At the proper time, the end-carry cores are read out to trip the proper hammers and a new circulation cycle is started. This continues for a total of 64 circulations at which time all characters have been printed and the data has been restored to its original form. Only the character data is circulated to the subtractor circuit 26; the end-carry information is destroyed each time so far as the circulation cycle is concerned.

A relatively simple subtraction circuit of the conventional type which merely subtracts 1 can be utilized when the code for the characters form a simple binary progression in the order that they appear on the drum. By means of suitable logic circuits, it is possible to go to any desired sequence of 64 states. Thus, instead of sequencing through the binary numbers, 0, 1, 2, 3—63 it could for example be a random sequence, such as 14, 27, 5, 23 or any other desired sequence, where special circumstances involving the nature of the computer or the printer require a random type of sequence.

Conventional subtractor circuits utilizing logic circuits and shift registers are well-known and their structures and principles are disclosed in "Arithmetic Operations in Digital Computers" by R. K. Richards, published November 1956 by D. Van Nostrand Co., Inc. Reference is made to typical subtractor circuits as shown on pages 113–118 of this book, simplified to take account of the fact that the subtrahend is continually 1. Shift registers of the type shown on page 145 of Richards' book, in Proc. I.R.E., volume 41, pages 993–999, 1953 in an article on "Shift Registers" by E. A. Sands, or in U.S. Patent 2,781,447, issued February 12, 1957 to B. R. Lester, may be used typically.

While I have described above the principles of my invention in connection with specific apparatus, it is to be clearly understood that this description is made only by way of example and not as a limitation to the scope of my invention as set forth in the objects thereof and in the accompanying claims.

I claim:

1. A print selection system comprising an array of print characters arranged in a predetermined succession of lines, each said line including an ordered series of identical characters, means associated with said array for successively advancing said lines into a predetermined printing position, beginning with a predetermined line of said succession, a source of a train of signal combinations associated with a line of characters to be selected from said array and printed, each said combination initially representing a numerical value corresponding to the line position in said succession of the associated print character relative to said predetermined line, means coupled to said advancing means and said source for storing said train while said predetermined line of said array is in said predetermined printing position, means coupled to said storing and advancing means for circulating said train relative to said storing means during each successive line advancement of said array, said circulating means including means for varying the signals in each said circulating combination to vary the numerical value thereof by a unit amount, means coupled to said circulating means for deriving an end-carry signal as each said circulating combination assumes a predetermined value, means coupled to said end-carry signal deriving means for shifting said end-carry signals relative to said ordered series of identical print characters, and means operative following the complete circulation of said train to apply said shifted end-carry signals to select corresponding characters from said ordered series in said printing position, to thereby successively print predetermined characters in variably selected positions forming the printed line of variable characters associated with said train.

2. A print selection system comprising an array of print characters arranged in a predetermined succession of lines, each said line including an ordered series of identical characters, means associated with said array for successively advancing said lines into a predetermined printing position, beginning with a predetermined line of said succession, a source of a train of signal combinations associated with a line of characters to be selected from said array and printed, each said combination initially representing a numerical value corresponding to the line position of the associated print character in said succession relative to said predetermined line, means coupled to said advancing means and said source for successively circulating said train in association with said successive line advances of said array, means associated with said circulating means for varying the signals in said combinations to vary the associated numerical values by a unit amount, means coupled to said circulating means for deriving an end-carry signal as each said circulating combination assumes a predetermined value, means coupled to said end-carry signal deriving means for shifting said end-carry signals relative to said ordered series of identical print characters, and means operative following the complete circulation of said train to apply said shifted end-carry signals to select corresponding characters from said ordered series in said printing position, to thereby successively print predetermined characters in variably selected positions forming the printed line of variable characters associated with said train.

3. A print selection system comprising an array of print characters arranged in a predetermined succession of lines, each said line including an ordered series of identical characters, means associated with said array for successively advancing said lines into a predetermined printing position, beginning with a predetermined line of said succession, a source of a train of signal combinations associated with a line of characters to be selected from said array and printed, each said combination initially representing a numerical value corresponding to the line position in said succession of the associated print character relative to said predetermined line, means coupled to said advancing means and said source for storing said train while said predetermined line of said array is in said predetermined printing position, means coupled to said storing and advancing means for circulating said train relative to said storing means during each successive line advancement of said array, said circulating means including means for varying the signals in each said circulating combination to vary the numerical value thereof by a predetermined amount, means coupled to said circulating means for detecting signal combinations representing a predetermined numerical value, and means coupled to said detecting and circulating means for selecting print characters in accordance with the relative positions of said detected combinations in said train, from corresponding positions of said ordered series in said printing position.

4. A print selection system comprising an array of print characters arranged in a predetermined succession of lines, each said line including an ordered series of identical characters, means associated with said array for successively advancing said lines into a predetermined printing position, beginning with a predetermined line of said succession, a source of a train of signal combinations associated with a line of characters to be selected from said array and printed, each said combination initially representing a numerical value corresponding to the line position of the associated print character in said succession relative to said predetermined line, means coupled to said advancing means and said source for successively circulating said train in association with said successive line advances of said array, means associated with said circulating means for varying the signals in said combinations to vary the associated numerical values by a predetermined amount, means coupled to said circulating means for detecting signal combinations representing a predetermined numerical value, and means coupled to said detecting and circulating means for selecting print characters in accordance with the relative positions of said detected combinations in said train from corresponding positions of said ordered series in said printing position.

References Cited in the file of this patent

UNITED STATES PATENTS

| | | |
|---|---|---|
| 2,692,551 | Potter | Oct. 26, 1954 |
| 2,745,092 | Moorhead et al. | May 8, 1956 |
| 2,850,566 | Nelson | Sept. 2, 1958 |
| 2,866,177 | Steele | Dec. 23, 1958 |
| 2,930,847 | Metzger | Mar. 29, 1960 |
| 2,959,638 | Sims | Nov. 8, 1960 |